United States Patent
Nawaz

(10) Patent No.: US 9,084,218 B2
(45) Date of Patent: *Jul. 14, 2015

(54) LOCATION-BASED SERVICE PROVIDER METHOD AND SYSTEM HAVING A USER CONTROLLED LOCATION PRIVACY MECHANISM

(71) Applicant: Pitney Bowes Inc., Stamford, CT (US)

(72) Inventor: Yassir Nawaz, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/900,779

(22) Filed: May 23, 2013

(65) Prior Publication Data

US 2014/0349682 A1    Nov. 27, 2014

(51) Int. Cl.
*H04W 24/00* (2009.01)
*H04W 64/00* (2009.01)
*H04L 9/32* (2006.01)
*H04W 4/02* (2009.01)

(52) U.S. Cl.
CPC .............. *H04W 64/00* (2013.01); *H04L 9/3257* (2013.01); *H04W 4/02* (2013.01)

(58) Field of Classification Search
CPC ....... H04L 9/3257; H04W 4/02; H04W 64/00
USPC .............................. 455/456.3, 456.1, 410, 411
See application file for complete search history.

(56) References Cited

U.S. PATENT DOCUMENTS 6,714,790 B2 * 3/2004 Heckard et al. ............. 455/456.1
7,386,318 B2    6/2008 Moon
(Continued)

FOREIGN PATENT DOCUMENTS

EP    0139313 A2    5/1985
EP    2375799 A1    10/2011
(Continued)

OTHER PUBLICATIONS

David Chaum, Achieving Electronic Privacy, Scientific American, Aug. 1992, pp. 76-81, No. 2, New York, NY.
(Continued)

*Primary Examiner* — Kamran Afshar
*Assistant Examiner* — Mong-Thuy Tran
(74) *Attorney, Agent, or Firm* — Brian A. Lemm; Charles R. Malandra, Jr.; Steven J. Shapiro

(57) ABSTRACT

Methods and systems for a user to receive location-based services for user selected locations while maintaining the privacy of his/her location unless in the vicinity of a user selected location. A user designates selected locations to the LBS provider. The LBS provider digitally signs grid cell identifiers of approved locations and the signatures are stored in the user's mobile device. The mobile device determines the grid cell identifier of its current location, blinds the grid cell identifier, and sends the blinded grid cell identifier to the LBS provider. The LBS provider digitally signs the blinded grid cell identifier, and returns the signature to the mobile device. The mobile device removes the blinding from the blinded signature to obtain the digital signature for the grid cell identifier. The user's mobile device then compares the signature of the grid cell identifier with those stored in its memory to determine whether the user is near any approved locations.

7 Claims, 3 Drawing Sheets

(56) References Cited

U.S. PATENT DOCUMENTS

| | | | |
|---|---|---|---|
| 8,090,357 B2 * | 1/2012 | Steel | 455/414.2 |
| 8,315,599 B2 | 11/2012 | Kasad | |
| 8,316,031 B2 | 11/2012 | Ramer | |
| 2001/0055975 A1 * | 12/2001 | McDonnell et al. | 455/456 |
| 2007/0270165 A1 | 11/2007 | Poosala | |
| 2007/0270166 A1 * | 11/2007 | Hampel et al. | 455/456.3 |
| 2008/0232586 A1 * | 9/2008 | Takada et al. | 380/255 |
| 2009/0047972 A1 * | 2/2009 | Neeraj | 455/456.1 |
| 2010/0014676 A1 * | 1/2010 | McCarthy et al. | 380/277 |
| 2010/0146091 A1 * | 6/2010 | Curtis et al. | 709/223 |
| 2011/0053614 A1 * | 3/2011 | Mishina et al. | 455/456.6 |
| 2012/0220308 A1 * | 8/2012 | Ledlie | 455/456.1 |

FOREIGN PATENT DOCUMENTS

| | | |
|---|---|---|
| WO | WO 90/04892 | 5/1990 |
| WO | WO 2012/087296 A1 | 6/2012 |

OTHER PUBLICATIONS

Gabriel Ghinita, Panos Kalnis, Ali Khoshgozaran, Cyrus Shahabi, Kian-Lee Tan, Private Queries in Location Based Services: Anonymizers are not Necessary, SIGMOD '08, Jun. 9-12, Vancouver, BC Canada.

* cited by examiner

LOCATION-BASED SERVICE PROVIDER METHOD AND SYSTEM HAVING A USER CONTROLLED LOCATION PRIVACY MECHANISM

FIELD OF THE INVENTION

The invention disclosed herein relates generally to location-based service provider systems, and more particularly to a location-based service provider methods and system in which the user can control when the location-based service provider can determine the user's location.

BACKGROUND OF THE INVENTION

In today's highly competitive business world, advertising to customers, both potential and previous, is a necessity. Businesses are always looking for ways to increase revenue, and increasing its sales to customers through advertising plays a large part in many business's plans for growth. Advertising has shown to be an effective method to inform, persuade or remind target buyers of the business's goods, services or goodwill, with the ultimate goal being that an advertisement will result in the sale of the goods or services. Studies have confirmed that the more that an advertisement can be made relevant and timely for a particular intended recipient, the more likely that it is to be successful. Location-based service (LBS) providers allow a business to provide a location-based service, e.g., coupon, advertisements, brochures, information, etc., to potential customers that are both timely and relevant. For example, a smart-phone (or other networked mobile device) user may register with the LBS provider to be provided with a service when the user is in the proximity of a selected business. This requires that the LBS provider be able to determine the location of the user. Typically this is done in one of two ways. The user's device can continually broadcast his/her location to the LBS provider or can use his/her device to manually 'check in' and search for nearby selected businesses. The first solution is flawed because it offers no location privacy for the user. The LBS provider continually receives the user's location, even when the user is nowhere near a selected business. The user is required to place great trust in the LBS provider; if the user does not want to be constantly tracked by the LBS provider, he/she will not sign up for the service.

The second solution is also less than ideal because it requires the user to actively send his/her location and search for nearby approved locations. This requires work on the part of the user. If the user does not check in frequently, the user may miss out on desired location-based services. Additionally, the LBS provider would receive a user's location only sporadically when the user inputs his/her location. A business that wants to advertise using the LBS provider may determine that it is not worth the fees imposed by the LBS provider if large numbers of potential customers are missed.

Another possible solution is for the user to download all locations of interest, e.g., all locations of a selected business, from the LBS provider to his/her mobile device. This allows the user to automatically figure out that he/she is near a selected business location without broadcasting his/her location. However the problem with this solution is that it reveals the LBS provider's database contents of business locations to the user, thereby preventing the LBS provider from offering an ongoing service.

SUMMARY OF THE INVENTION

The present invention alleviates the problems described above and provides methods and systems that allow a user to receive location-based services for user selected businesses while maintaining the privacy of his/her location when not in the vicinity of a user selected location. Thus, the LBS provider will know the user's location if and only if the user is near a location selected by the user. If the user is in an area where there are no user selected locations, the user's location will be protected from the LBS provider. In addition no manual input on the user's side is required, and the user can automatically receive location-based services when near a user selected location. The solution also preserves the privacy of the LBS provider database allowing it to offer an ongoing service.

In accordance with embodiments of the present invention, a user registers with an LBS provider by designating selected locations, also referred to as approved locations, to the LBS provider, using, for example, a mobile device. The LBS provider maintains a database of business locations and other information based on a grid having a plurality of cells, each with a unique identifier. The LBS provider determines the grid cell location(s) in which the approved locations are located and digitally signs those grid cell identifiers. The signatures of the grid cell identifiers (without the actual grid cell identifiers) for approved locations are returned to the user's mobile device and stored therein. To determine if the user is near an approved location, the user's mobile device determines the grid cell identifier of its current location, blinds the grid cell identifier using a randomly chosen secret value, and sends the blinded grid cell identifier to the LBS provider. Because the grid cell identifier in which the mobile device is located is blinded, the LBS provider will not know of the current location of the mobile device. The LBS provider digitally signs the blinded grid cell identifier, and returns the signature to the mobile device. The mobile device uses the secret value to remove the blinding from the blinded signature to obtain the digital signature for the grid cell identifier. The user's mobile device then compares the signature of the grid cell identifier with those stored in its memory to determine whether the user is near any approved locations. Only if the un-blinded signature matches a signature stored in the memory of the mobile device, which indicates the user is near an approved location, will the user's mobile device return its location, in an un-blinded form, to the LBS provider. The LBS provider can then return a location-based service, e.g., electronic coupon, advertisement, or the like, to the user's mobile device or forward the user's location to a participating company which sends the location-based service to the user. If the signature does not match a signature stored in the mobile device, indicating that the user is not near an approved location, the user's device will not provide its location to the LBS provider and its current location is kept secure. Thus, the LBS provider will only know the user's location if and only if the user is near a user approved location.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like of corresponding parts.

DETAILED DESCRIPTION OF THE PRESENT INVENTION

Figure 1:
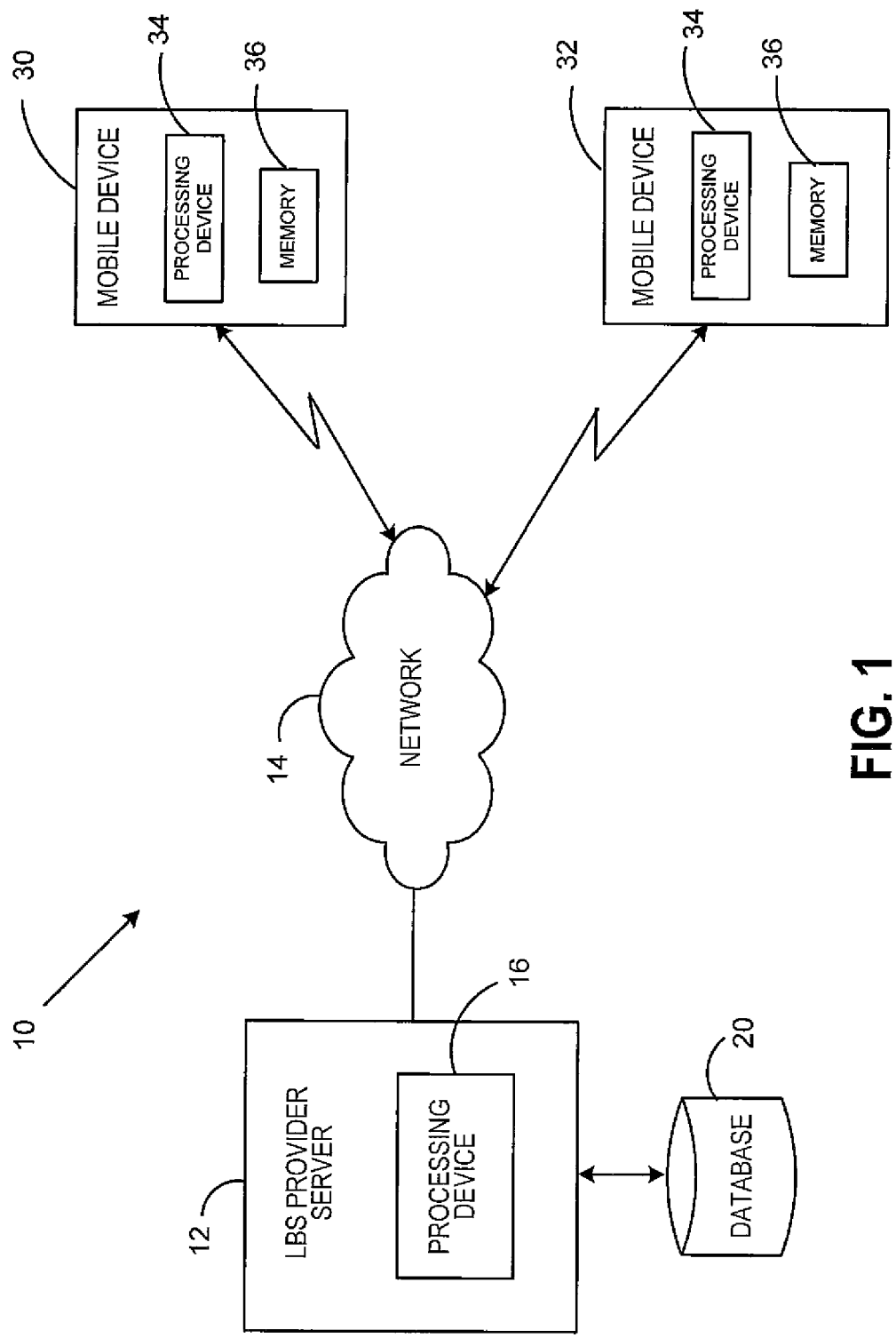
FIG. 1 illustrates in block diagram form a system according to an embodiment of the present invention.

In describing the present invention, reference is made to the drawings, wherein there is seen in FIG. 1 a block diagram of a system 10 in which the present invention can be implemented. System 10 includes a server 12 operated by a location-based service provider that is coupled to a communication network 14, such as, for example, a wireless cellular communication network. Server 12 may be a mainframe or the like that includes at least one processing device 16. Server 12 may be specially constructed for the required purposes, or it may comprise a general purpose computer selectively activated or reconfigured by a computer program (described further below) stored therein. Such a computer program may alternatively be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, which are executable by the processing device 16. One of ordinary skill in the art would be familiar with the general components of a server system upon which the method of the present invention may be performed. Server 12 can communicate with one or more users operating one or more mobile devices 30, 32 via the network 14. Mobile devices 30, 32 can include, for example, smart-phones, tablets, personal data assistants, or any other type of electronic device that has network capability and can allow a user to access the network 14 to send and receive data from any other device capable of accessing the network 14. It should be understood that while two devices 30, 32 are illustrated in FIG. 1, there is no limit to the number of devices and/or users of such devices. Each mobile device 30, 32 is provided with one or more processing devices 34 that controls the operation and functions of the mobile device and a memory device 36.

System 10 also includes a database 20 that is in electronic communication with the server 12. Database 20 stores locations for one or more businesses that have registered with the LBS provider. Database 20 may also contain additional information such as types of businesses, crime statistics for different neighborhoods, demographic information for different neighborhoods, etc. This information helps the LBS provider provide to the user additional choices in selecting approved locations as described below. The present invention utilizes a spatial grid structure having a plurality of cells to quantize and index locations. A grid can be defined in many ways, provided that each location with a given latitude/longitude is associated with a unique cell of the grid. For example, the United States can be divided into many 100×100 meter cells that are each associated with a unique identifier. Any building in the United States will be located within one of these cells. It should be understood, of course, that the cell size need not be limited to the example provided above, and could be any size as desired. The specific cell into which a specific location falls can be determined, for example, using known geocoding technology. Thus, each location of a business will be associated with a unique cell of the grid. Database 20 stores a table that associates each location of a business with a grid cell based on the identifier of the cell. Database 20 may also store additional tables that associate grid cells with attributes such as crime, average income, commercial activity etc. The defined grid is also accessible by mobile devices, e.g., mobile devices 30, 32, such that each device is able to determine in which cell of the grid it is currently located (as described further below). Additionally, database 20 stores one or more advertisements or other information provided by the businesses that have registered with the LBS provider for sending to potential customers as described further below.

Figure 2:
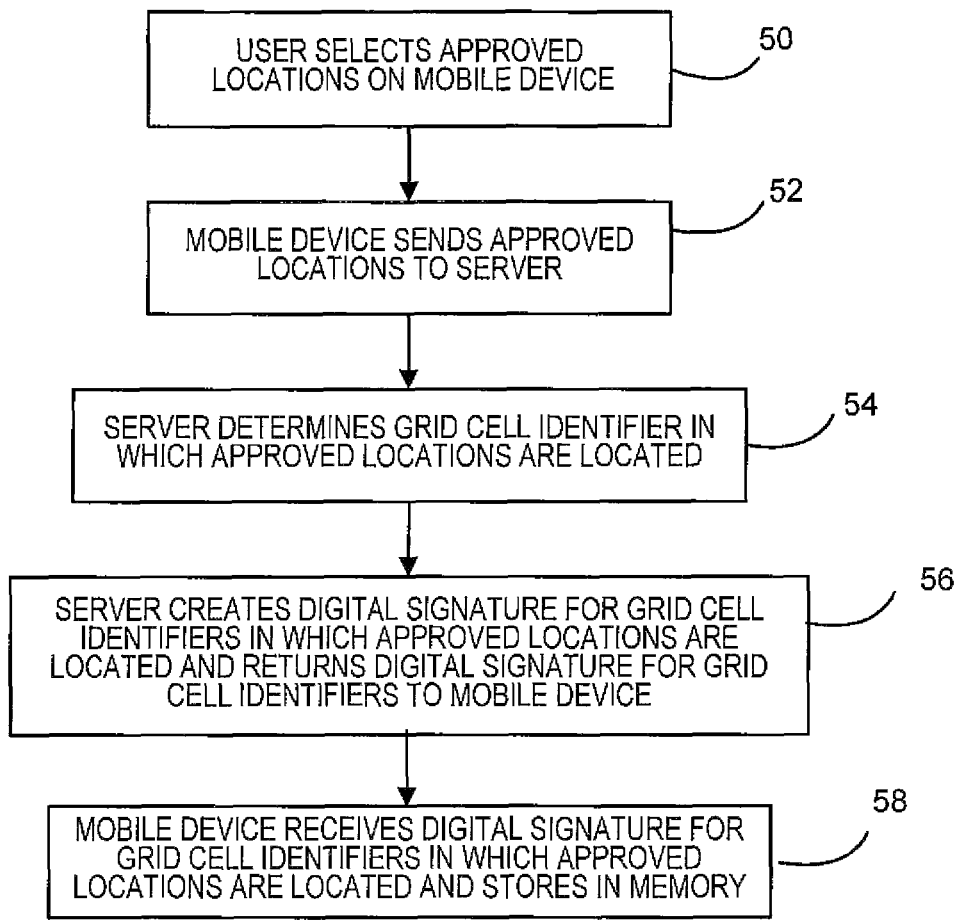
FIG. 2 illustrates in flow diagram form the processing performed during the selection of approved locations according to an embodiment of the present invention.

FIG. 2 is a flowchart that illustrates an example of the registration operation of the system 10 shown in FIG. 1 according to an embodiment of the present invention. Any suitable cryptography scheme can be used in the operation of system 10. The only requirement is that the scheme must let the user's mobile device and the LBS server 12 determine if the user's current grid cell identifier matches one of the grid cell identifiers selected by the LBS for the user, without revealing the user's current grid cell identifier to the LBS or the grid cell identifiers selected by the LBS to the user. Simple RSA signatures and RSA blind signatures, two well-known cryptographic signature schemes, are used to describe the operation of the present embodiment. RSA is a well-known signature scheme in which the signer generates a RSA key pair (d, e), where d is the signer's private key and e is the corresponding public key, and makes e publically available. If an entity wants to obtain the signer's signature on a message m, it sends the message m to the signer. The signer then uses its private key d to create a signature s for the message and returns the signature s to the requester. Anyone having access to public key e can verify the signature s of the message m. A blind RSA signature scheme is similar to the RSA signature with a one main difference. The requester, before sending the message m to the signer, blinds it with a randomly chosen secret value r to obtain a blinded message l. Instead of sending the message m to the signer, the requester sends the blinded message l to the signer. The signer creates a signature t for the blinded message l using its private key d and returns the signature t to the requester. The requester then uses the secret value r to remove the blinding from signature t to obtain the un-blinded signature s of message m. Again, anyone having access to public key e can verify the signature s of the message m. The RSA blind signature scheme, however, allows the requester to obtain a digital signature for message m from the signer without having to reveal the message m to the signer. In describing the present embodiments, the LBS provider generates an RSA key pair (d, e) where d is the LBS provider's private key and e is the LBS provider's public key. The LBS service provider can use the same RSA key pair to communicate with all mobile users or it can generate a unique RSA key pair to communicate with each mobile user.

In step 50, when a user of a mobile device, e.g., mobile device 30, desires to receive location-based services from the LBS provider, the user will select approved locations on the mobile device. In step 52 user's mobile device will send one or more approved locations selected by the user to the LBS provider server 12. An approved location is a location which the user desires to receive a location-based service, e.g., electronic coupon, offering, advertisement, information, etc., via a mobile device when the user is physically near such a location. An approved location can be as specific as a particular business by name, e.g., Starbucks, or as general as a business type, e.g., retail clothing stores, shopping malls, etc., or refer simply to a physical location with certain attributes, e.g., low crime rate, affluent suburb, urban shopping district, etc. In step 54, the processing device 16 will utilize the information stored in the database 20 to determine the grid cell identifier in which each of an approved location, e.g., store, town, etc., is located for the approved locations provided by the user. In step 56 the processing device 16 will sign each of these grid cell identifiers individually and return only the signatures on the grid cell identifiers to the mobile device 30. The grid cell identifiers themselves are not sent to the mobile device 30. To make these signatures specific to each user, the processing device 16 may combine the grid cell identifiers with user specific information such as user's unique identification number and then sign this combination of grid cell identifier and user specific data using the simple RSA signature algorithm. In step 58 the mobile device 30 will receive and store these signatures on the grid cell identifiers in the local memory 36 of the device. This information may also be stored in encrypted or unencrypted form in the database 20 in association with the user.

Figure 3:
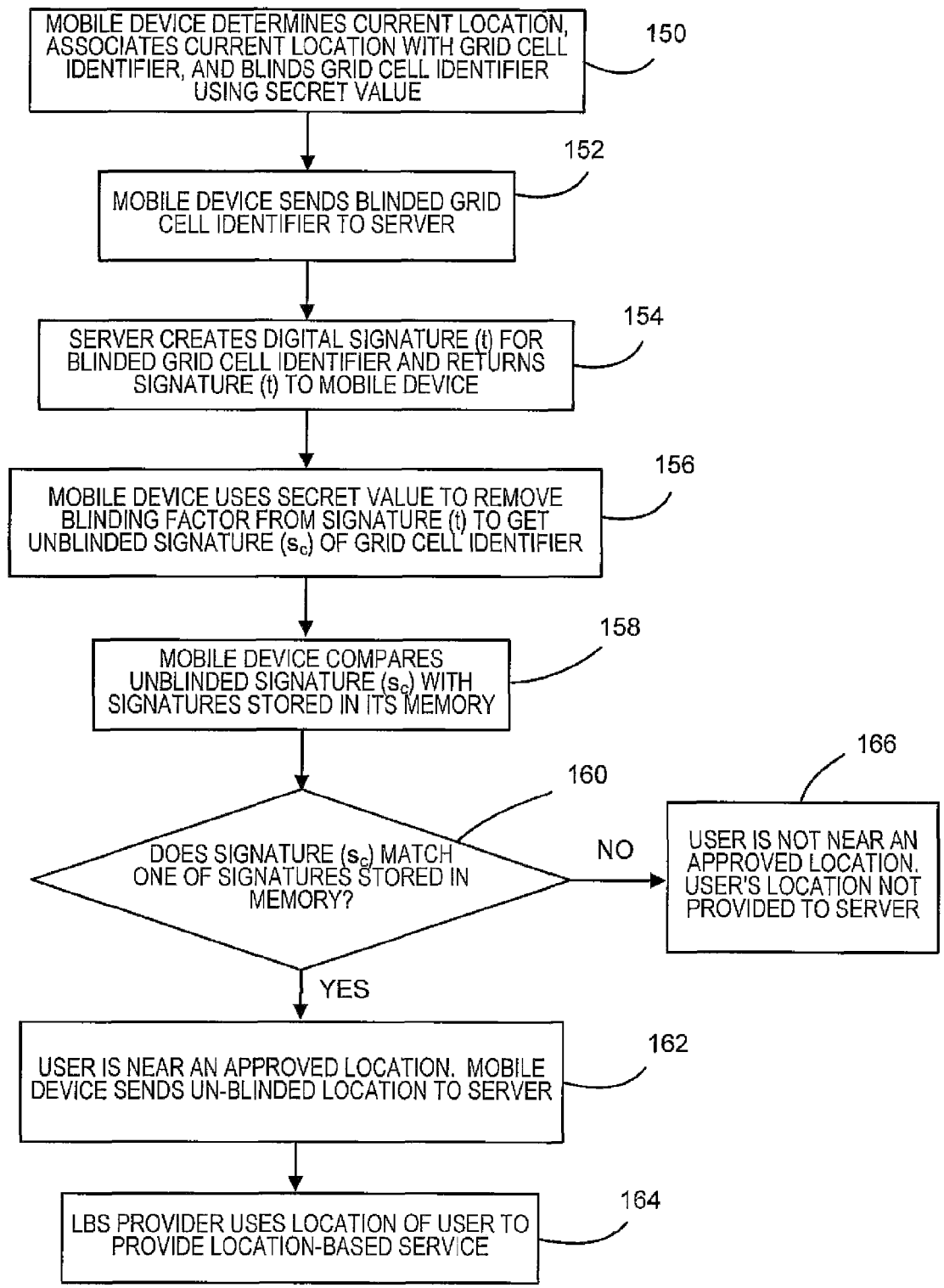
FIG. 3 illustrates in flow diagram form the processing performed to check whether the user is near an approved location according to an embodiment of the present invention.

FIG. 3 is a flowchart that illustrates an example of operation of the system 10 shown in FIG. 1 to determine whether the user is near an approved location according to an embodiment of the present invention. Once a user has registered with the LBS provider as described in FIG. 2, the user can operate a mobile device 30 to obtain desired location-based services without having to divulge its current location unless the user is near an approved location. The user achieves this by obtaining the signatures for his current grid cell identifier from the LBS provider server 12 using RSA blind signatures and then comparing this signature with the signatures stored in the mobile device's 30 local memory 36. In step 150, the processor 34 of the user's mobile device 30 determines its location, using any known technology such as GPS technology or triangulation, and associates its current location with a grid cell identifier x (described above). Processor 34 will then blind this grid cell identifier using a randomly chosen secret value r to obtain a blinded grid cell identifier I, i.e., $I=r^e$ x mod n. Note that if desired the user can also combine x with user specific data and use that combination of x and user specific data in place of x. In step 152, the user's mobile device 30 sends this blinded grid cell identifier I to the LBS provider server 12. Because the location is provided after blinding, the LBS provider server 12 is unable to determine the location of the mobile device 30, and thus the mobile device 30 can continually broadcast its location to the LBS provider server 12 without the user having to worry about the LBS provider constantly tracking his/her location, even in areas where there are no approved locations. Alternatively, the user's mobile device 30 can automatically initiate a broadcast of its location (in blinded format as described above) according to a specified time interval, e.g., every five minutes, or the user can manually operate the mobile device 30 to initiate a broadcast of its location (in blinded format as described above) to the server 12. If the location broadcast is continuous or automatically initiated, the amount of communication necessary can be reduced by not sending or initiating the location broadcast if the user's location has not changed, i.e., the user is still located in the same grid cell as the previously sent location broadcast.

In step 154 the LBS provider server 12 signs the blinded grid cell identifier I using its private key d and produces a blind RSA signature t, i.e., $t=I^d$ mod n, and returns the blinded signature t to the mobile device 30. In step 156 the processor 34 of the mobile device 30 uses the randomly chosen secret value r used in step 150 to remove the blinding from blind signature t to obtain the signature $s_c$ on un-blinded grid cell identifier x, i.e., $s_c = t\, r^{-1}$ mod $n = x^d$ mod n. Note that the user's mobile device 30 has managed to obtain the signature on its current grid cell identifier x from the LBS provider server 12 without revealing the grid cell identifier x to the LBS provider server 12. In step 158, the processor 34 of the user's mobile device 30 compares signature $s_c$ to the signatures stored in its local memory 36, which are signatures of grid cell identifiers in which a user approved location is present as described with respect to FIG. 2. In step 160, the processor 34 determines if signature $s_c$ matches one of the signatures stored in the local memory 36. If in step 160 it is determined that signature $s_c$ does not match any signatures stored in the local memory 36, then this means that the mobile device 30, and hence the user, is not near an approved location, and in step 166 the mobile device 30 will not send its location to the server 12.

If in step 160 it is determined that signature $s_c$ matches one of the signatures stored in the local memory 36, then this means that the mobile device 30, and hence the user, is in the same grid cell as an approved location. In step 162, the mobile device 30 will send its location, using the grid cell identifier x in an un-blinded form, to the server 12. Thus, the LBS provider (server 12) will not learn of the location of the user (mobile device 30) unless the user is near to a user approved location, i.e., within the same grid cell identifier as an approved location. It should be understood that the definition of "near" to a user approved location can be adjustable and is not limited to being within the same grid cell as an approved location, but instead can be expanded to include a group of grid cells. For example, when a user provides approved locations (step 52) and the processing device 16 of the server 12 utilizes the information stored in the database 20 to determine the grid cell identifier in which each of an approved location is located (step 54), the processing device 16 can expand the number of cells that constitute an approved location by including all cells adjacent to a cell in which an approved location is located. Thus, an approved location could encompass a group of cells instead of just the single cell in which a business is located. The processing device 16 will utilize all of the grid cell identifiers for the group of cells when performing the processing as described above with respect to step 56.

Once the LBS provider server 12 has the location of the mobile device 30, then in step 164 the LBS provider can use the location to provide the user with a location-based service. For example the server 12 can retrieve one or more advertisements stored in the database 20 and send it to the user's mobile device 30. Alternatively, the LBS provider can choose not to return its own location-based service to the user but to share the location x of the user with any participating companies. A participating company can then choose to directly return a location-based service (e.g., an electronic coupon) to the user, or can choose to forward a specific location based service to the LBS provider server 12 which then forwards it to the user. Other possibilities and combinations exist to provide the location-based service to the user once the user's location is revealed, all of which may be used with the present invention. Preferably, when the mobile device 30 sends its location to the server 12 in un-blinded form, it will also create a log of the revealed location along with the time and store them locally. This information can be used to check that the LBS provider is not improperly trying to violate a user's privacy by sending signatures on grid cells that are not occupied by a user approved location during the registration process (FIG. 2). The user can occasionally check this log to see which locations have been sent to the server 12, and if one of the revealed locations is not among the user's approved locations, the user will know that the LBS provider is violating its agreement and can drop the service.

Thus, as described above, the user of a mobile device 30 can receive location based services without having to constantly divulge his/her location to the LBS provider except for those instances in which the user is near a user approved location. In the description provided above, the LBS provider manages the user's location privacy preferences and the underlying grid structure. It should be understood that the present invention is not so limited and a third party provider can be used for these processes and act as an intermediary between a user and various LBS providers that the user has engaged.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for a user to receive a location-based service on a mobile device without having to divulge a current location of the user unless the user is near a user approved location, the method comprising:
    determining, by the mobile device, a current location of the user based on a grid cell identifier;
    creating, by the mobile device, a blinded current location using the determined grid cell identifier and a random number;
    sending, by the mobile device, the blinded current location to a server;
    receiving, by the mobile device, a first digital signature generated by the server for the blinded current location;
    processing, by the mobile device, the first digital signature for the blinded current location using the random number to obtain a second digital signature for the grid cell identifier;
    comparing the second digital signature for the grid cell identifier to digital signatures for grid cell identifiers in which user approved locations are located that are stored in the mobile device;
    determining, by the mobile device, that the user is near a user approved location when the second digital signature of the grid cell identifier matches a digital signature for a user approved location that is stored in the mobile device;
    sending, by the mobile device, the current location of the user to the server; and
    receiving, by the mobile device, a location-based service based on the current location of the user.

2. The method of claim 1, wherein the location-based service includes at least one of an electronic coupon and advertisement.

3. The method of claim 1, wherein the first digital signature is a blind Rivest-Shamir-Adleman (RSA) signature and the second digital signature is a Rivest-Shamir-Adleman (RSA) signature.

4. A method for a providing a location-based service to a user operating a mobile device, the method comprising:
    receiving, by a server, a blinded current location of the mobile device;
    generating, by the server, a digital signature for the blinded current location of the mobile device;
    sending, by the server, the digital signature for the blinded current location to the mobile device for processing by the mobile device;
    receiving, by the server, the current location of the mobile device from the mobile device in un-blinded form only when the mobile device determines that its current location is near a user approved location based on the digital signature returned to the mobile device; and
    using the current location of the mobile device to provide a location-based service to the user operating the mobile device.

5. The method of claim 4, wherein the location-based service includes at least one of an electronic coupon and advertisement.

6. A system for providing location-based services, the system comprising:
    a mobile device adapted to determine a current location based on a grid cell identifier, combine the grid cell identifier with a random number to produce a blinded current location of the mobile device, and transmit the blinded current location of the mobile device; and
    a server adapted to receive the blinded current location of the mobile device, generate a first digital signature for the blinded current location of the mobile device and return the first digital signature for the blinded current location to the mobile device for processing by the mobile device;
    the mobile device being further adapted to process the first digital signature for the blinded current location using the random number to obtain a second digital signature for the grid cell identifier, compare the second digital signature for the grid cell identifier to digital signatures for grid cell identifiers in which user approved locations are located that are stored in the mobile device, determine that the user is near a user approved location when the second digital signature of the grid cell identifier matches a digital signature for a user approved location that is stored in the mobile device, and send the current location of the user to the server;
    wherein the server is further adapted to use the current location of the mobile device to provide a location based service to the mobile device.

7. The system of claim 6, wherein the location-based service includes at least one of an electronic coupon and advertisement.

* * * * *